May 19, 1959 E. R. GUTZMER 2,886,894
COLLOCATING APPARATUS FOR PHOTOCOMPOSING
Filed July 12, 1957 4 Sheets-Sheet 2
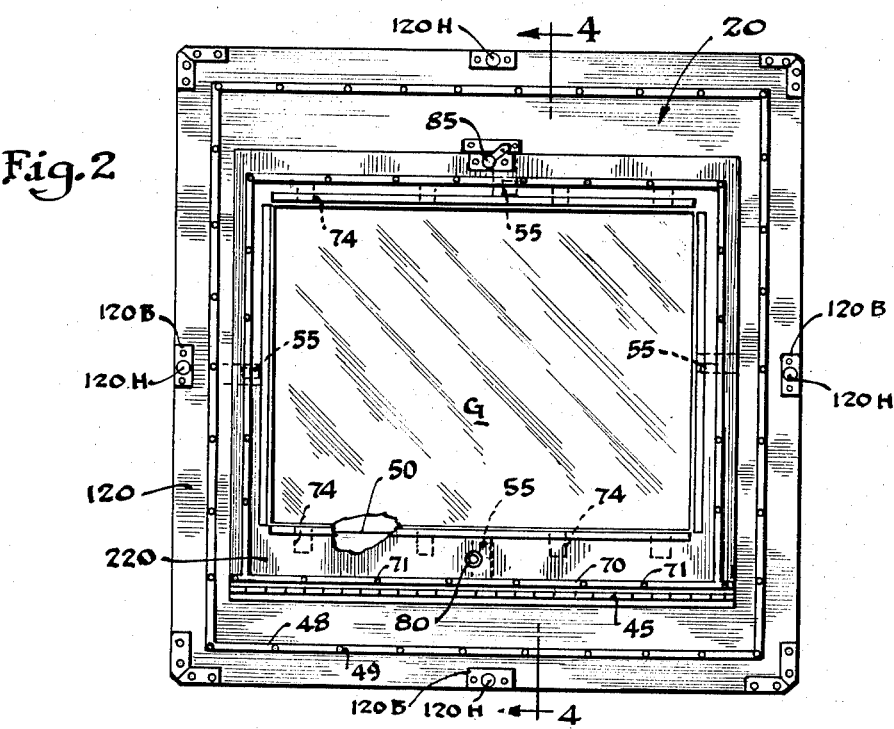
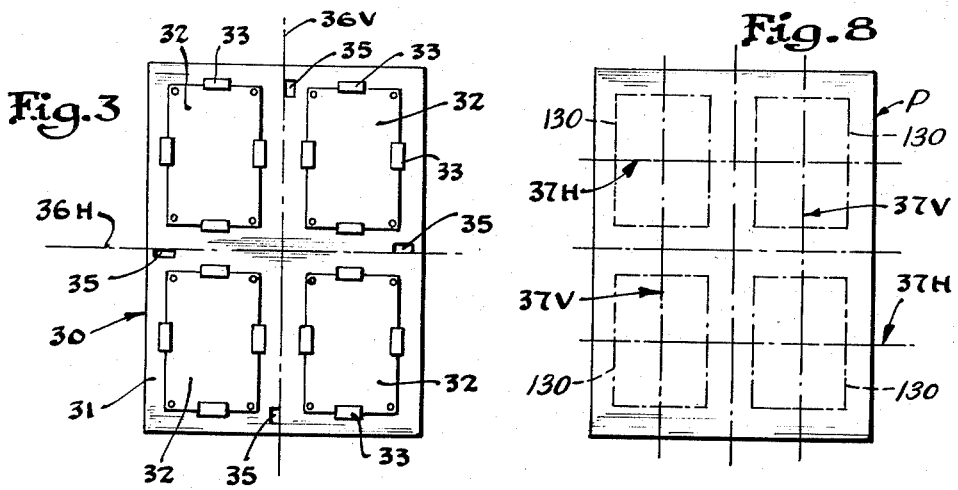
Inventor
Ernest R. Gutzmer
By Mann, Brown & McWilliams
Attorneys May 19, 1959
E. R. GUTZMER
2,886,894
COLLOCATING APPARATUS FOR PHOTOCOMPOSING
Filed July 12, 1957
4 Sheets-Sheet 3
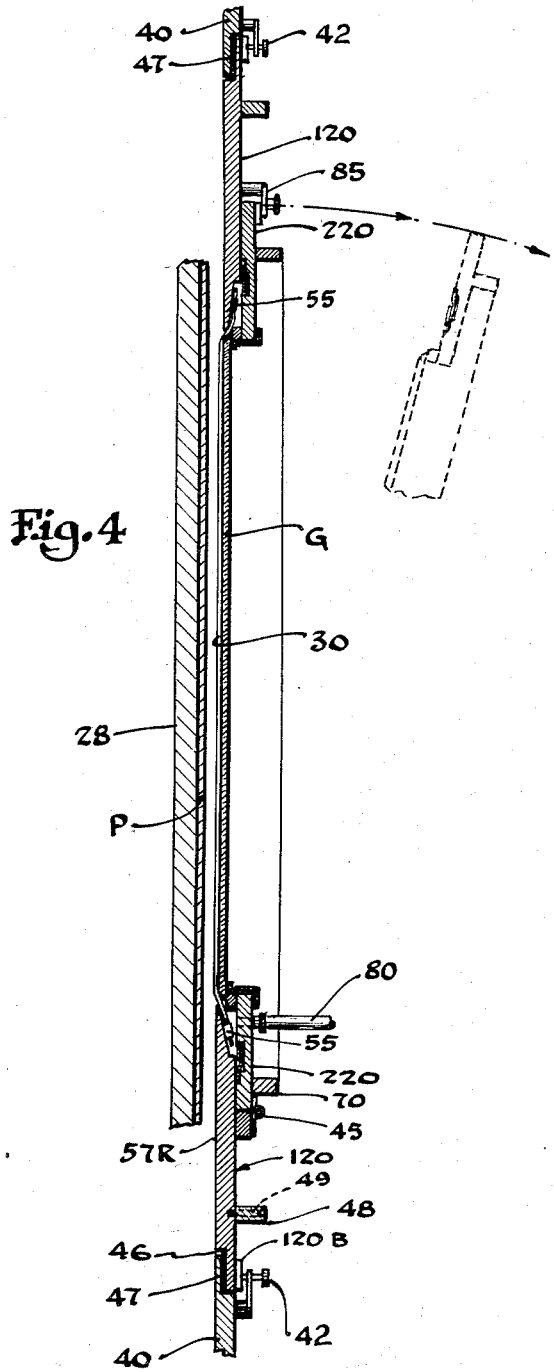
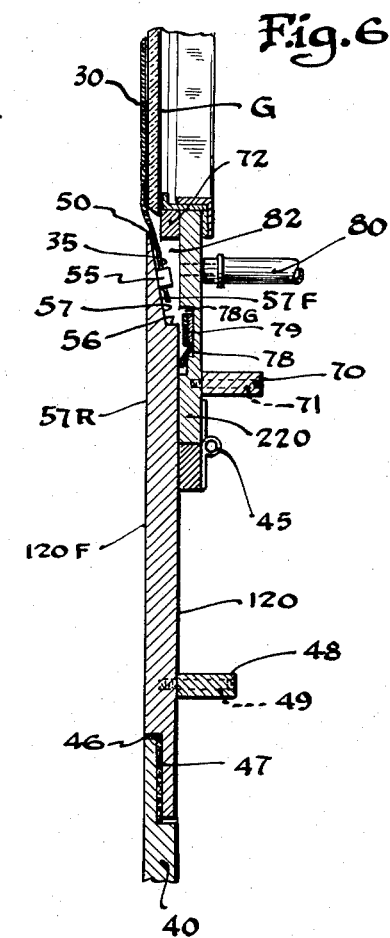
Inventor
Ernest R. Gutzmer
By Mann, Brown & McWilliams
Attorneys May 19, 1959 E. R. GUTZMER 2,886,894
COLLOCATING APPARATUS FOR PHOTOCOMPOSING
Filed July 12, 1957 4 Sheets-Sheet 4
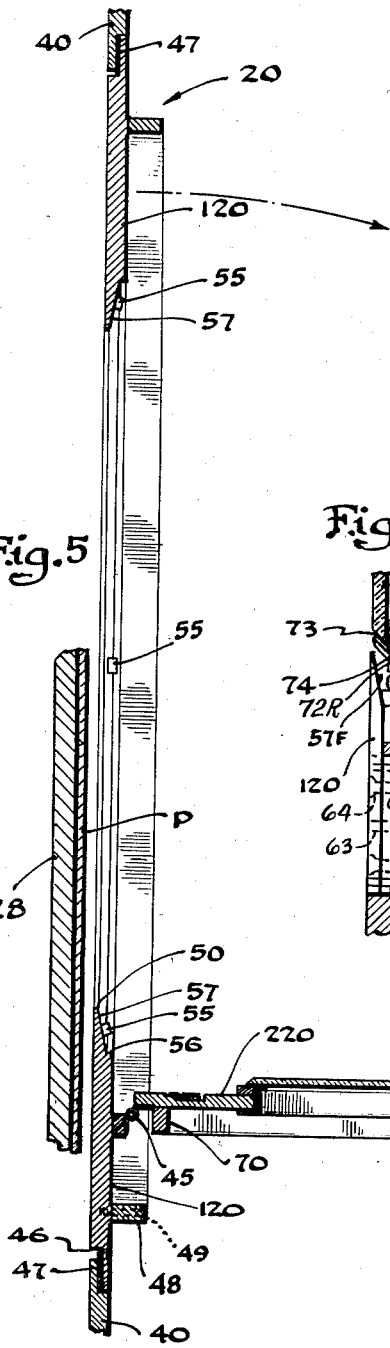
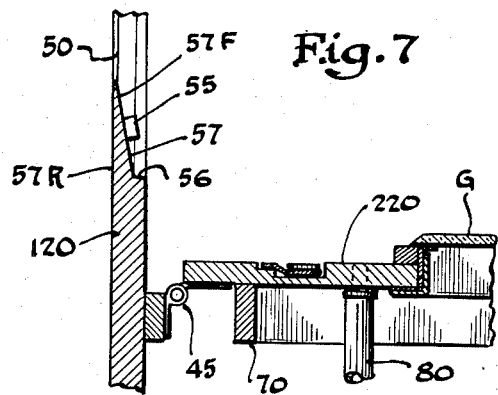
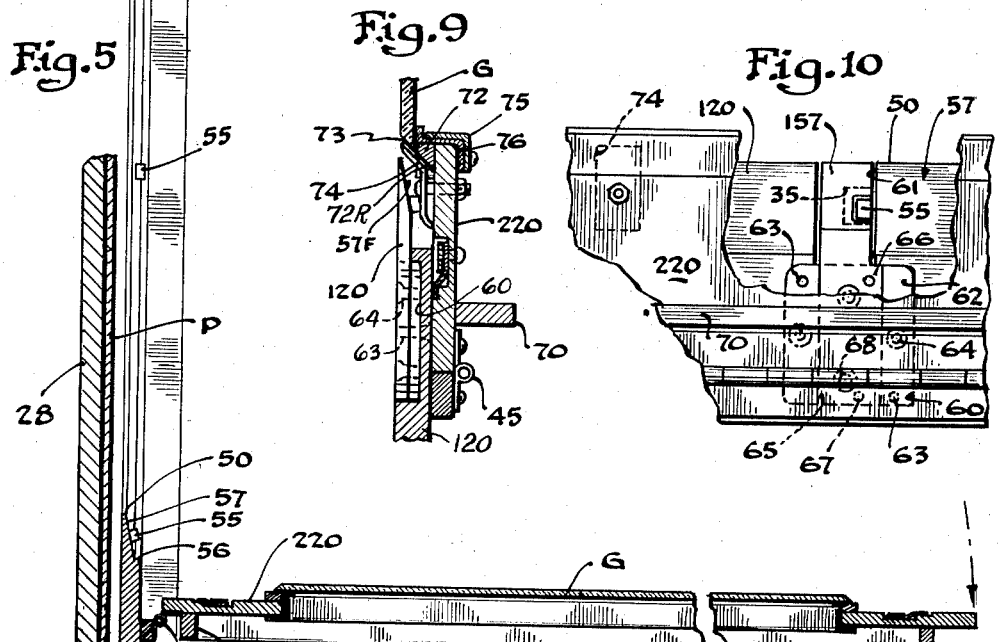
Inventor
Ernest R. Gutzmer
By Mann, Brown & McWilliams
Attorneys United States Patent Office 2,886,894
Patented May 19, 1959

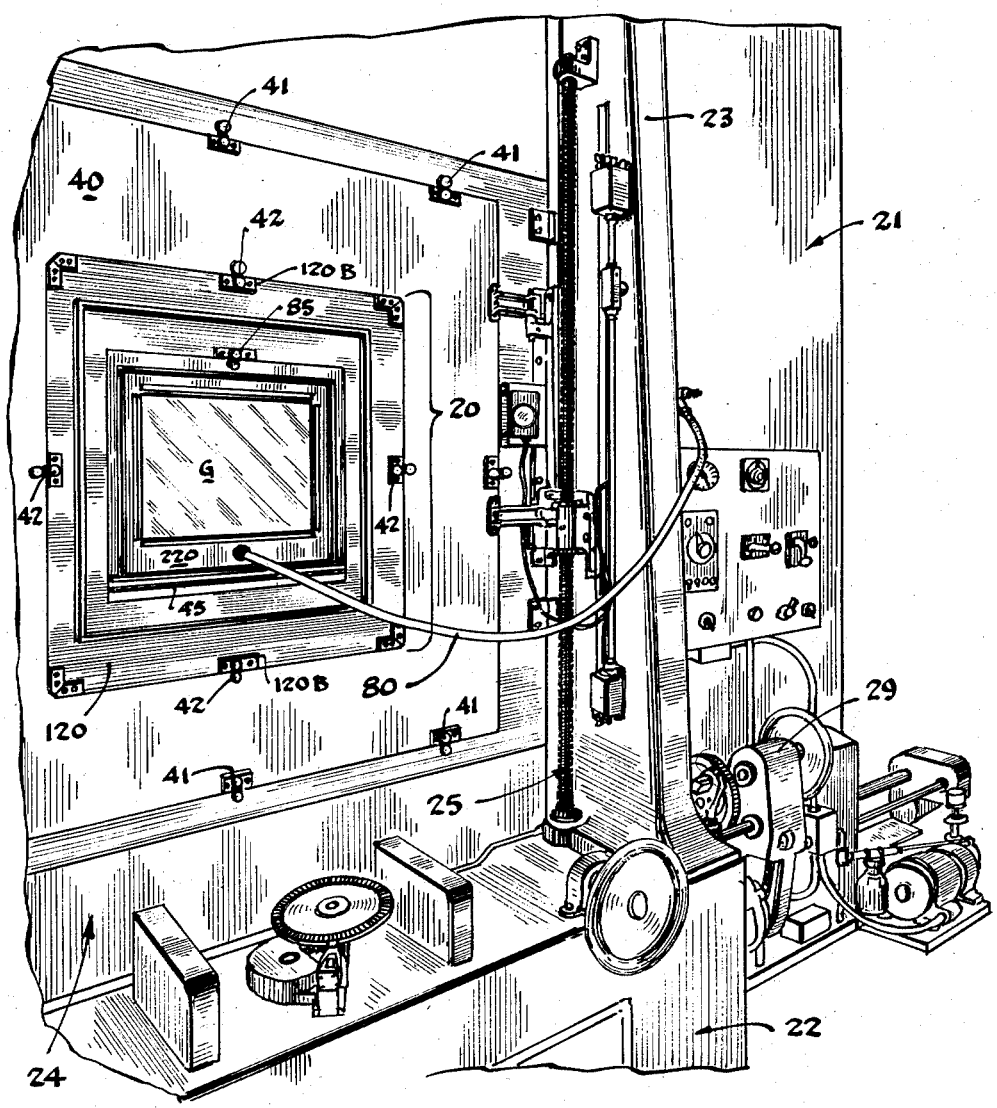

2,886,894

COLLOCATING APPARATUS FOR PHOTOCOMPOSING

Ernest R. Gutzmer, Hinsdale, Ill., assignor to Intercompany Corporation, Chicago, Ill., a corporation of Illinois Application July 12, 1957, Serial No. 671,585

10 Claims. (Cl. 33—184.5)

This invention relates to photocomposing and particularly to the mounting of transparencies in the negative or transparency holder of a step-and-repeat photo composing machine.

In machines of the aforesaid character it is particularly important in connection with multicolor work to attain precise location of the image-bearing transparencies in the negative or transparency holder of the machine, and without such precision of initial location, accuracy of setting of the principal positioning elements of the machine is ineffective to produce accurately related printing plates for the several colors that are to be employed.

In machines of the aforesaid character the common practice is to provide a holder which supports the image-bearing transparency, and while this holder is often termed the "chase," it is more frequently referred to as the negative holder, despite the fact that the transparencies mounted therein may be either positives or negatives and may constitute a single transparency or a group assembly of a plurality of transparencies on a single transparent plastic carrier sheet. Such negative holders embody a glass pane through which the light passes during exposure, and the holder has locating openings that cooperate with locating pins whereby the negative holder may be accurately located on the movable carriage of the machine or may be placed in a similar accurate location on and with respect to a register table. Thus when a negative or transparency is to be mounted in the negative holder, such negative holder is removed from the machine and is put in position on the register table where register pins locate the negative holder in a precise relationship with respect to an underlying ground glass upon which etched hair lines are provided as a basis register means. With the holder in this position on the register table, the common practice is for the workman to visually register the negative or transparency on the carrier glass of the negative or transparency holder so that register lines on the negative coincide with the hair lines or basic register lines that are provided on the ground glass of the register table. The negative or transparency is then fixed in this position by taping the negative to the glass of the negative holder. It is then necessary to remove the negative holder from the register table and to replace the same in its original accurate location on the carriage of the photocomposing machine and as above pointed out, the location is determined by register pins on the machine that engage locating openings in the negative holder. The operator then must connect the vacuum line to the negative holder, and then after the backboard carrying the sensitized printing plate has been moved forwardly into contact with the negative or transparency, the necessary vacuum is applied and the shiftable light source is moved into position and the exposure is made. In different types of machines, the relative shifting of the negative holder and the sensitized printing plate is accomplished in different ways, and as an example, in the Rutherford step-and-repeat photocomposing machine the backboard is shiftable along a horizontal axis, while the carrier upon which the negative holder is mounted is shiftable along a vertical axis. Shifting means of an extremely accurate character are provided for the backboard and for the vertically movable carriage so that the successive positions of the backboard and the carriage may be established within an extremely low tolerance.

After a printing plate has had the necessary exposures made thereon from a transparency pertaining to a particular color, the negative holder is removed from the machine and is returned to the register table where the first negative is removed and a negative pertaining to another color is visually positioned in the desired location as above described, and the exposure procedures are repeated in respect to a second printing plate.

It is well known that the successive visual registering operations that are thus necessary in connection with multicolor plate making operations are quite time consuming and the manual labor involved in shifting the negative holder back and forth between the machine and the register table is considered to be quite burdensome.

As another and probably more important factor, however, it is recognized in the trade that there is inherent in the process of visual registration a considerable possibility for error in positioning of the successive transparencies on the negative holder, and such errors often result in a lack of registery of the several colors in the final printed product. In view of the foregoing, it is the primary object of the present invention to simplify the mounting and accurate location of transparencies in the negative holder of step-and-repeat photocomposing machines, and to accomplish this in such a way as to avoid the necessity for removing the entire negative holder whenever a new or different negative is to be mounted therein. More specifically, it is an object of the present invention to enable permanently mounted register pins to be employed in a negative holder of the aforesaid character and to enable these permanently mounted register pins to have the negative mounted thereon without the necessity for removal of the negative holder from the machine.

Other and more specific objects of the invention are to eliminate the usual taping of the transparencies to the negative holder, and to provide register pins in a negative holder for a step-and-repeat photocomposing machine so that these register pins face toward the front of the machine and may be exposed for mounting or dismounting of transparencies merely by opening a door which carries the glass plate of the negative holder.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

Fig. 1 is a fragmentary perspective view illustrating the invention as embodied in a known type of step-and-repeat photo-composing machine.

Fig. 2 is an enlarged front elevational view of the negative holder of the present invention.

Fig. 3 is a face view of a transparency made up in form of a group composition assembly adapted for mounting in the negative holder of Figs. 1 and 2.

Fig. 4 is an enlarged vertical sectional view taken substantially along the line 4—4 of Fig. 2.

Fig. 5 is a view similar to Fig. 4 showing the negative holder in its open position that it occupies when a transparency is to be mounted in and removed from the holder.

Fig. 6 is an enlarged cross-sectional view illustrating a portion of Fig. 4 in greater detail.

Fig. 7 is an enlarged sectional view showing a portion of Fig. 5 in greater detail.

Fig. 8 is a view of a typical layout of repetitive images produced on a printing plate with a step-and-repeat machine of the kind illustrated herein.

Fig. 9 is a cross-sectional view similar to Fig. 6 and showing the specific mounting of the glass pane and the register pins; and Fig. 10 is a fragmentary elevational view of the register pin mounting of Fig. 9.

For purposes of illustration the invention has been illustrated herein as embodied in a negative holder 20 that is employed in a known type of step-and-repeat photocomposing machine 21. The machine 21 is of the well-known Rutherford type in which a base 22 has a pair of spaced vertical columns 23 between which a plate-like vertical carriage 24 is mounted and guided for vertical movement under control of an accurately graduated actuating mechanism 25 whereby the vertical location of the carriage 24 may be determined within relatively close limits of tolerance. It is upon the plate-like carriage that the negative holder 20 is mounted as will be described in detail hereinafter. The photocomposing machine 21, on the rear face thereof, is provided with a backboard 28 upon which a printing plate P may be mounted for photographic exposure of image material, mounted in the negative 30 holder, onto the sensitized surface of the printing plate P. The backboard 28 in machines of this character is adapted to be lowered through a pivotal movement to a horizontal position so that printing plates P may be mounted on or removed from the backboard, and when the backboard is in its vertical position, it may be moved from front to rear so as to engage and disengage the plate P with respect to the rear face of the carriage 24 and the negative holder 20.

The backboard 28 in this machine may be shifted longitudinally in a plane parallel to the carriage 24, but at right angles to the vertical path of shifting movement of the carriage 24, and thus the relative positioning of the image material with respect to the plate P may be adjusted along axes that are at right angles to each other. The adjusting movement of the backboard 28 is horizontal or from right to left in the machine and is accomplished by a micrometer drive mechanism 29 so that this adjustment may also be accomplished within low limits of tolerance.

In machines of the aforesaid character, the location of the image material on and with respect to the printing plate P is determined with respect to the center of the image material. Thus, in Fig. 8, a plate P has been shown diagrammatically to illustrate the way in which four images are to be located on such a plate. Such location is, of course, based upon an original determination of the center of the image material, and in Fig. 3 of the drawings a transparency 30 in the form of a group composition assembly has been shown wherein a transparent carrier sheet 31 has four different photographic transparencies 32 secured thereon as by tape 33. The particular locations of transparencies 32 on the carrier 31 are accurately determined with respect to register openings 35 that are formed in the carrier sheet 31 and such locations of the transparencies 32 on the carrier sheet may be accomplished according to the method that is disclosed in my co-pending application Serial No. 665,-838, filed June 14, 1957. The register openings 35 that are shown as being incorporated in the group composition assembly of Fig. 8 are located in a particular relationship to vertical and horizontal center lines 36V and 36H of the assembly 30, and these register openings and their locations are in accordance with the Ozga register system that is disclosed in the Franciszek Ozga Patent No. 2,793,442, patented May 27, 1957.

It should here be pointed out that the Ozga system of register openings is employed in the present instance because such system accurately locates the center of the image material in the same desired location even though there may be expansion or contraction of the sheet upon which the image material is carried. In those instances where variations of temperature with the attendant expansion or the contraction of the carrier sheet are not encountered, other systems of register openings and register pins may be employed within the scope of the present invention.

It is also important to note that the image material or transparency 30 that is illustrated in Fig. 3 is in the form of a group assembly where individual photographic transparencies are mounted on a transparent carrier sheet, but it is also within the purview of the present invention to utilize a transparency where but a single image or a plurality of images have been produced photographically thereon rather than by mounting of individual and independently mounted transparencies on a transparent carrier sheet.

Referring again to Fig. 8 of the drawings, the successive exposures of the image material of the transparency 30 onto a plate P are determined or established by locating the center of the transparency 30 successively at the intersections of horizontal lines 37H with vertical locating lines 37V, and an exposure is made with the transparency 30 opposite each of these locations. Although Figs. 3 and 8 are positioned side by side and are of the same size, Fig. 8 actually is at a one-fourth scale with respect to Fig. 3, and each of four exposures from the transparency 30 is indicated at 130 in Fig. 8. The successive positionings of the image material opposite these locations on the plate P is accomplished by shifting of the vertically movable carriage 24 and the horizontally adjustable backboard 28. This manner of setting the plate and the image material in the desired successive relationships is, of course, merely illustrative since there are many other types of step-and-repeat photocomposing machines where the parts are adjustable in different ways.

The negative holder 20 of the present invention is herein illustrated in one of the smaller sizes in which the invention may be embodied so that it is mounted in a centered relation in the vertical carriage 24 by means of what may be termed a filler frame 40 which is secured accurately in position on the carriage 24 by means including a plurality of locating pins 41 in accordance with usual practice. In this respect it should be observed that where different sizes of negative holders 20 are to be employed, a different filler frame 40 is substituted on the carriage 24 and this is in accordance with usual practice in machines of this character. About the inner opening of the filler frame 40, conventional securing and locating devices 42 are provided that are normally used to position and secure the usual or known negative holder on the carriage 24, and these same securing and locating devices 42 are utilized in mounting the negative holder 20 of the present invention in position on the carriage 24, as will be described.

The negative holder 20 of the present invention is best shown in Figs. 4 to 7 of the drawings and comprises a main outer frame 120, and an inner frame 220 that has a central glass panel G opposite and behind which the transparency 30 is located for the exposure operation, and the inner frame 220 is shiftably mounted as by hinging at 45 on the outer frame 120 so that the inner frame 220 may be shifted between a closed position shown in Fig. 4 of the drawings and an open position shown in Fig. 5 of the drawings.

The outer frame 120 of the present negative holder 20 has its rear outer edge rabbeted as at 46 so as to provide a lap joint with the filler frame 40, and a resilient vacuum sealing strip 47 is provided throughout the extent of this lap joint. On its forward face, the outer frame 120 has a stiffening bar 48 secured in position thereon by screws 49. At the midpoints of its outer side edges the outer frame 120 has positioning blocks 120B fixed therein and these blocks have positioning holes 120H, Fig. 2, therein for cooperation with the clamping and locating devices 42 of the filler frame 40.

The outer frame 120 is formed at its inner edge to define opening 50 that is somewhat smaller than the size of the transparency 30 that is to be mounted in the negative holder, and under the present invention the inner bordering portions of the frame 120 about the opening 50 are so formed and are so related to the closure frame 220 that a plurality of register pins 55 may be mounted thereon so as to face or extend in a forward direction and be exposed when the closure frame 220 is open. Through this arrangement a transparency 30 may be mounted on the register pins 55 by engaging its register openings 35 with the register pins 55. The edges of the register openings 35 that lie on the axes 36V and 36H constitute the locating edges of such openings, and the openings 35 are somewhat larger than the rectangular cross section of the pins 55 so that the pins 55 are contacted only by the locating edges of the openings 35. As will be evident particularly in Fig. 5 of the drawings, the inner edge of the outer frame 120 is rabbeted at its forward corner at 56 so as to define a tapering inner border portion 57. The tapering border or edge portion 57 thus has its rear face 57R formed as a continuation of the rear face of the frame 120, but its forward face 57F is formed so as to slope quite gradually toward the rear face 57R and at the edge 50 where it defines the opening of the frame 120, the border portion 57 is relatively thin.

The several register pins 55 are individually mounted in the frame 120 at the midpoints of the respective sides of the frame so that location of the register pins 55 is accurately determined and is in accordance with the locations of the register openings 35. As herein shown, the frame 120 is made from relatively light metal such as aluminum and at the locations where the register pins 55 are to be mounted, the frame is formed with a relatively deep and generally square recess 60, and inwardly beyond this recess the thin tapered edge portion 57 is cut away as at 61 to form a slot 61 extending from the recess 60 entirely to the inner edge 50 of the frame. Within the recess 60, a locating block 62 is positioned in an accurate location determined by dowel pins 63, and is held in this position by cap screws 64. The block 62 has a slot 65 formed therein extending toward the center of the frame 120, and a flat rigid bar 66 is seated in this slot in an accurate location determined by pins 67 and is held in position by cap screws 68. At the inner end of the bar 66, an integral arm 157 is formed which conforms in shape with the cross sectional form of the tapered portion 57 and this arm 157 extends in and completely fills the slot 61 so that the outer or remote end of the arm 157 forms a continuation of the edge 50 of the frame 120, while front and rear faces of the arm 157 are disposed in the respective planes of the faces 57F and 57R. On the forward sloping face of the arm 157 the register pin 55 is integrally formed in an accurately determined position so that when the block 62 and the bar 66 are put into position in the frame, the several register pins 55 will occupy the desired accurate positions on and with respect to the frame 120.

The cover or closure frame 220 is also formed from a light metal such as aluminum and has a stiffening bar 70 fixed thereon by a series of cap screws 71. At its inner edge, the frame 220 is formed to support the glass plate G which is mounted on the frame 220 so that when the frame 220 is in its closed position of Fig. 4, the rear face of the glass plate G will be located in the same plane as the rear face 57R of the outer frame 120, and its edges will be spaced inwardly a short distance from the edges of the opening 50 of the frame 120. The glass pane G is mounted on a spacing strip 72 which locates the glass rearwardly of the rear face of the frame 220, and the pane G, as seen in Fig. 9, has a beveled edge as indicated at 73 and is held in position on the strip 73 of the frame 220 by a series of fastening clips 74 that engage the beveled edge 73. These clips 74 are recessed to a slight extent at 72R into the spacing strips 72, and have their end edges shortened and beveled so that the border edge of a transparency 30 may be bent slightly at the outer rear edge of the glass G and may extend in a plane along the forwardly sloped surface 57F of the main frame 120.

About the forward inner edge of the frame 220 a fastening angle 75 is provided which holds a flexible sealing strip 76 in engagement with the frame 220 and with the adjacent border portion of the glass G to afford a vacuum seal between the glass and the frame 220. At a point adjacent to the shoulder 56 of the frame 120, the closure frame carries a continuous sealing strip 78, Fig. 6, of a resilient material that is held in a place in a mounting groove 78G by clamping strips 79 so that when the closure frame 220 is in its closed position, an effectual vacuum seal will be formed between the frame 120 and the frame 220, thus to enable a vacuum to be established about the frame 220 and between the transparency 30 and the plate P. Such a vacuum is established by means including a flexible vacuum line 80 that is connected to the cover frame 220 in the relationship shown in Figs. 1, 4, and 6.

The spacing strip 72 that is used at the inner edge of the frame 220 to space the glass G rearwardly cooperates with the rear face of the frame 220 to define a clearance space 82 into which the pins 55 project in a forward direction. The pins 55 terminate rearwardly of the rear face of the closure frame 220, but are spaced relatively close to this rear face. Thus when the closure frame 220 is in its closed position, as shown in Figs. 4 and 6, the rear face of the glass G is located in the plane of the rear face 57R of the frame 120, and a transparency 30 may extend across the rear surface of the glass G in engagement therewith, and at its border portions, the transparency 30 may bend slightly out of its major plane and may extend through the space between the glass G and the opening or edge 50, thus to extend into the space 82 along the gradually sloping forward face of 57F of the frame 120. Thus the register openings 35 which are formed in these border portions of the transparency 30 within the clearance space 82 may embrace and engage the register pins 55 so as to accurately center the transparency 30 with respect to the negative holder 20.

In the use or operation of the negative holder 20 of this invention the closure frame 220 is opened to the position shown in Figs. 5 and 7 of the drawings, and this exposes the forward face 57F of the tapered border portion 57 of the main or stationary frame 120 with the register pins 55 facing forwardly or toward the operator, and the operator may then mount a transparency 30 across the opening 50 with the register openings 35 of the transparency engaging the several register pins 55, and the transparency will thus be supported in a spanning relationship across the opening 50 and forwardly of the tapered border 57 of the main stationary frame 120. The operator then moves the closure frame 220 to its closed position that is shown in Figs. 4 and 6, and the frame 220 is latched in this position as by means of a latch 85 that is herein shown as being of a cam type disposed at the central upper portion of the frame 120 for engagement with the upper portion of the closure frame 220 when this frame is in its closed position.

Such closure of the frame 220 engages the rear face of the glass G with the transparency 30 and forces the engaged portion of the transparency in a rearward direction until the rear face of the glass G is in the plane of the rear surface 57R of the main frame. The register openings 35 remain engaged with the register pins 55 so that, when the frame 220 has been fully closed and latched, the transparency 30 is in an accurately centered position in the negative holder 20.

The machine 21 may be adjusted or operated so as to locate the transparency opposite the desired position on the printing plate P, and the successive exposures and relocations of the parts may be performed in the usual manner to complete the exposure of the desired image material on the plate P.

After such completion of a printing plate P, the plate P may be removed from the machine for the usual development procedures, and a new plate may be put in position on the backboard. Then, by merely opening the closure frame 220, the transparency 30 that has been used may be removed, and another transparency may be put into accurately centered position in the negative holder 20 merely by placing the same on the pins 55 and thereafter closing and latching the closure frame 220.

From the foregoing description, it will be apparent that the present invention materially simplifies the mounting and accurate location of transparencies in the negative holder of a step-and-repeat photocomposing machine, and further it will be apparent that such simplification is accomplished in a way that makes it unnecessary to remove and replace the negative holder whenever a different negative is to be mounted therein. It will also be apparent that this invention eliminates the necessity for and the errors inherent in the usual visual positioning of transparencies in negative holders, and that it enables the required operations to be performed at a great saving in time, as to both the operator and the machine.

It will also be apparent that this invention eliminates the usual taping of transparencies to the negative holder, and it enables permanently mounted register pins to be employed in such a way that the transparencies may quickly and easily be mounted in or removed from the negative holder, while at the same time assuring an extreme accuracy of centering of the transparencies in the negative holder.

Thus while I have illustrated and described a preferred embodiment of my invention it is to be understood that changes and variations may be made by those skilled in the art without departing from the spirit and scope of the appending claims.

I claim:

1. In a negative holder for photo composing machines, a stationary outer frame having front and rear faces and against the rear face of which a photographically sensitized printing plate may be positioned, said frame having an opening across which a photographic transparency may be positioned with its bordering edges overlapping the portions of said front face that border said opening, register pins stationarily mounted on the front face in said border portions and adapted to engage register openings in the bordering portions of such a transparency to center the same relative to said opening, and a closure frame mounted on said outer frame for movement from an open position to a closed position and having a central glass pane positioned to engage such a transparency as the closure frame is moved to closed position to hold the transparency on said pins and force the engaged central areas of the transparency to the plane of said rear surface.

2. A negative holder according to claim 1 wherein opposed portions of said frames are formed with a clearance space therebetween in which the register pins are located.

3. A negative holder according to claim 1 in which a vacuum seal is provided between said frames outwardly of said inner border portions of said outer frame.

4. A negative holder according to claim 1 in which the inner border portions of said outer frame are tapered rearwardly to form a border rim terminating in a relatively thin edge that defines said opening of the outer frame.

5. A negative holder according to claim 1 in which the inner border portions of said outer frame are tapered rearwardly to form a border rim terminating in a relatively thin edge that defines said opening of the outer frame and in which the register pins are integrally formed on separate mounting members secured on said outer frame and constituting continuations of the tapered surfaces of said border rim.

6. A negative holder according to claim 1 in which the glass pane is mounted with a vacuum seal on the rear face of said closure with its edges spaced inwardly from the edge of said opening.

7. A negative holder according to claim 1 in which the glass pane is mounted with a vacuum seal on the rear face of said closure with its edges spaced inwardly from the edge of said opening, and in which a continuous vacuum seal is provided between said frames outwardly of said register pins.

8. A negative holder according to claim 1 in which separate mounting blocks are secured in accurate locations on the outer frame opposite the locations of the register pins and said register pins are integrally formed on carrier bars fixed in the respective blocks.

9. A negative holder according to claim 1 in which the closure frame is permanently mounted on said outer frame for shifting movement between said positions.

10. A negative holder according to claim 1 in which the closure frame is permanently mounted on said outer frame for shifting movement between said positions, and in which a vacuum line is permanently associated with said closure frame to remain connected thereto during such shifting movement.

References Cited in the file of this patent

UNITED STATES PATENTS

| | | |
|---|---|---|
| 2,793,442 | Ozga | May 28, 1957 |
| 2,819,535 | Dexter | Jan. 14, 1958 |
| 2,825,976 | Radecic | Mar. 11, 1958 |